US 8,255,303 B2

(12) United States Patent
Scipioni

(10) Patent No.: US 8,255,303 B2
(45) Date of Patent: Aug. 28, 2012

(54) SYSTEMS AND METHODS FOR MAKING PAYMENTS FROM SELECTED FUNDING SOURCES

(75) Inventor: Germán Scipioni, San Jose, CA (US)

(73) Assignee: eBay Inc., San Jose, CA (US)

( * ) Notice: Subject to any disclaimer, the term of this patent is extended or adjusted under 35 U.S.C. 154(b) by 934 days.

(21) Appl. No.: 12/176,978

(22) Filed: Jul. 21, 2008

(65) Prior Publication Data

US 2010/0017302 A1 Jan. 21, 2010

(51) Int. Cl.
*G06Q 40/00* (2006.01)
(52) U.S. Cl. .................. 705/35; 705/4; 705/44
(58) Field of Classification Search .............. 705/35, 705/41, 44
See application file for complete search history.

(56) References Cited

U.S. PATENT DOCUMENTS

| | | | |
|---|---|---|---|
| 5,845,265 A * | 12/1998 | Woolston | 705/37 |
| 7,702,540 B1 * | 4/2010 | Woolston | 705/26.3 |
| 7,860,784 B2 * | 12/2010 | Bedier | 705/38 |
| 7,890,393 B2 * | 2/2011 | Talbert et al. | 705/35 |
| 2004/0078328 A1 * | 4/2004 | Talbert et al. | 705/40 |
| 2006/0085333 A1 * | 4/2006 | Wah et al. | 705/40 |
| 2006/0089906 A1 * | 4/2006 | Rowley | 705/40 |

* cited by examiner

*Primary Examiner* — Lindsay M. Maguire
(74) *Attorney, Agent, or Firm* — Haynes and Boone, LLP

(57) ABSTRACT

Systems and methods for operating a payment service provider include storing information associating the identity of a buyer with a plurality of the buyer's payment source accounts and a plurality of personal identity numbers (PINs) respectively associated therewith in a database of the payment service provider. Upon receipt of an authorization from the buyer that includes a specified payment amount and the associated PIN of the selected buyer's account from which the payment is to be made, a transaction device of the service provider is operable to effect a transfer of the specified payment amount from the selected buyer's account to the designated seller's account.

20 Claims, 3 Drawing Sheets

SYSTEMS AND METHODS FOR MAKING PAYMENTS FROM SELECTED FUNDING SOURCES

BRIEF DESCRIPTION OF THE INVENTION

This invention relates generally to electronic commerce, and more particularly, to systems and methods for making payments for goods or services from a selected one of a plurality of funding sources using only a single payment device, such as a debit card.

BACKGROUND

In a familiar scenario involving the purchase of goods or services, a buyer or customer presents a seller or merchant with a payment device, typically a debit or credit card having, e.g., a magnetically encoded strip on its surface, and the card is "swiped" or scanned with another device typically provided by the seller, e.g., a "card reader." The card reader reads from the card the identity and buyer's account number of the source of funds that the buyer wishes to use to pay for the goods, and is also typically pre-provisioned by the seller with the identity and account number of the acquirer depository into which the seller wishes the payment funds to be transferred.

The reader device then establishes contact, typically via a data communication network, e.g., the internet or a public switched telephone network (PSTN), with the issuer source of payment funds, which may be a bank, credit union, credit provider, such as Visa or MasterCard, or a payment service provider, such as Intuit's Quicken Bill Pay or eBay's PayPal payment services. The payment source then prompts the buyer for the entry, typically by the pressing of keys of a keypad, of a unique, secret password and/or personal identification number (PIN) associated with the buyer's account, and if the payment request is deemed to be authentic, and if sufficient funds are available in the buyer' account, the transaction is then cleared or settled, i.e., the designated buyer's and seller's accounts are respectively debited and credited with the amount of the payment.

The foregoing "cashless," "checkless" or "electronic" payment scenario, although relatively convenient and secure for both buyers and sellers, presents a drawback for those buyers who, for a variety of reasons, e.g., accounting, tax, legal, or other considerations, wish to make selected purchases with funds drawn from different payment sources. For example a buyer with a small business may wish to fund purchases made for business purposes with funds drawn from a first source, and to fund purchases made for personal use from a second payment source. To accomplish this, the buyer is forced into the relatively inconvenient arrangement of having to carry and use two different payment devices, e.g., debit or credit cards, each having an associated funding source and PIN number.

A need therefore exists for systems and methods that enable a buyer to make a payment to a seller from a selected one of a number of available funding sources conveniently and with the use of only a single payment device, such as a debit or credit card.

SUMMARY

In accordance with various aspects of the present invention, systems and methods are provided for enabling buyers to make payments to sellers from a selected one of a plurality of funding sources using only a single payment device, such as a debit card, a credit card, a personal computer (PC) or a personal digital assistant (PDA).

In one example embodiment, a method for operating a payment service provider includes storing information associating the identity of a buyer with a plurality of the buyer's payment source accounts and a plurality of personal identity numbers (PINs) respectively associated therewith in a database of the payment service provider. The service provider includes a transaction device, such a server, that is operable to receive an authorization from the buyer to make a payment from a selected one of the buyer's payment source accounts to a designated seller's payment depository account, the authorization including a specified payment amount and the associated PIN of the selected buyer's account from which the payment is to be made, and upon receipt of the authorization, to effect a transfer of the specified payment amount from the selected buyer's account to the designated seller's account.

A better understanding of the above and many other features and advantages of the novel payment systems and methods of the present invention may be obtained from a consideration of the detailed description of some example embodiments thereof below, particularly if such consideration is made in conjunction with the several views of the appended drawings, wherein like elements are referred to by like reference numerals throughout.

DETAILED DESCRIPTION

Figure 1:
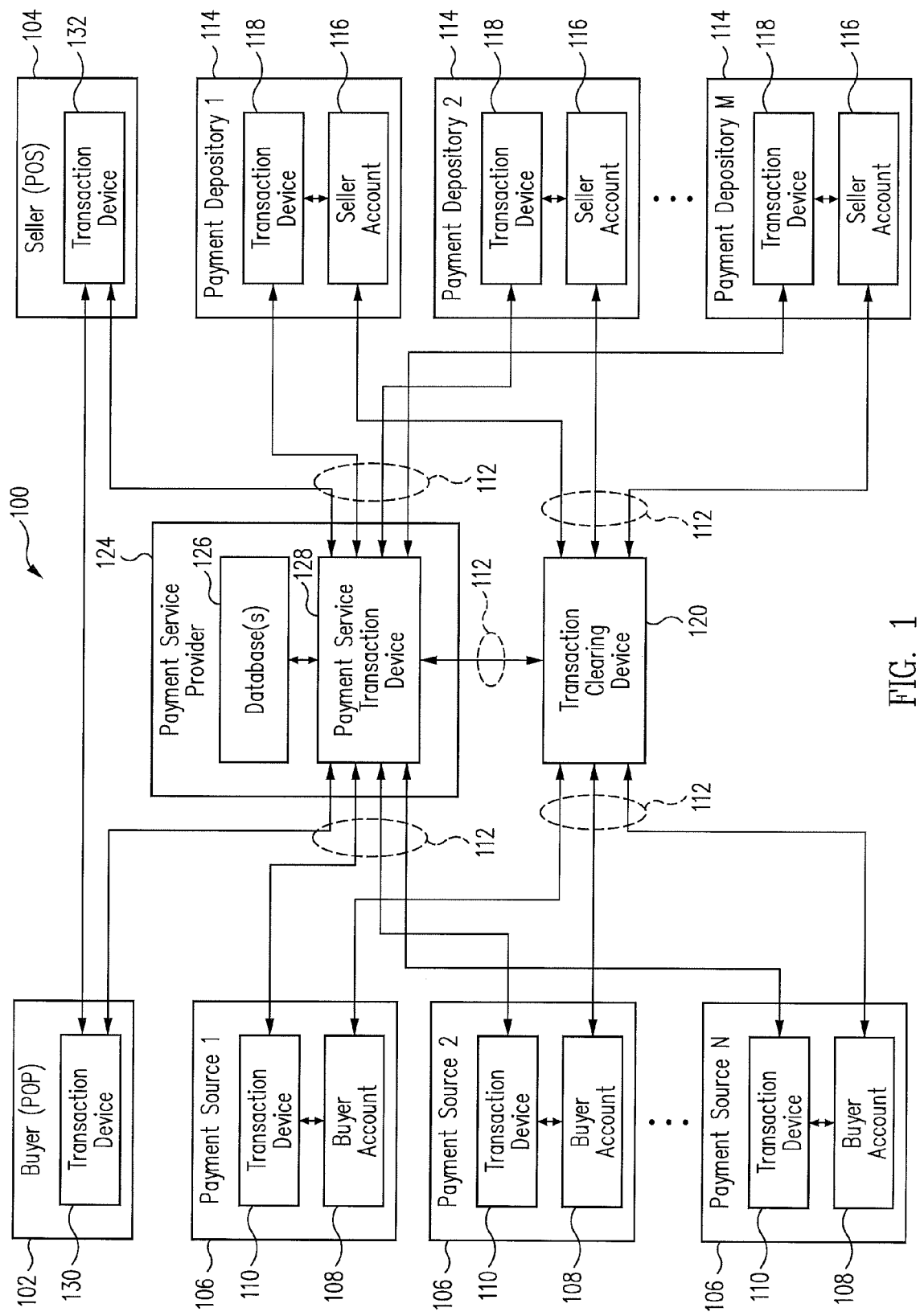
FIG. 1 is a functional block diagram of an example embodiment of a system for enabling a buyer to make payments to a seller from a selected one of a plurality of funding sources in accordance with the present invention.

In accordance with the present invention, an example embodiment of a system 100 for enabling a buyer 102 located at a point of purchase (POP) to make payments to a seller 104 located at a point of sale (POS) from a selected one of a plurality of funding sources 106 is illustrated in the functional block diagram of FIG. 1. In the particular embodiment illustrated in FIG. 1, the buyer POP 102 is shown located remotely from the seller POS 106, as in the case of, for example, the buyer making an online purchase from a remotely located seller's web-based marketplace. However, it should be understood that the system 100 and methods described herein are equally useful in situations in which the POP and POS are the same, i.e., where the buyer and seller are located at the same place, e.g., at the seller's premises, such as a store, market or an automated teller machine (ATM).

As will be appreciated, individual buyers typically have a number of previously established sources 106 from which payments to sellers can be funded. These typically comprise "issuing" institutions, such as banks, credit unions, credit card issuers, such as American Express, Diners Club, Discover, JCB, MasterCard or Visa, payment service providers, such as PayPal, and the like, at which the buyer 102 has at least one buyer's account 108 established. In some instances, a buyer may have more than one account 108 at a given institution, e.g., a checking/debit account and a credit account.

In a conventional payment arrangement, each of the respective payment sources 106 provides a transaction device, e.g., a payment card, to the buyer for each of the buyer's accounts at that institution, and each of the cards may have a security device, such as a unique password or personal identification number (PIN) associated with it, which the buyer is required to provide when, for example, making a payment with funds from the associated account. Each of the cards typically has the respective identities of the issuing payment source 106, the buyer 102 and the buyer's account 108 associated with it, e.g., by means of an appropriately coded magnetic strip or radio frequency identification (RFID) chip disposed on or embedded in the card, which can be read or scanned with a suitable card reader or scanner. However, the security device associated with the particular buyer's account used to verify the buyer's identity is never associated with the card, but instead, is maintained separately and in secrecy by the buyer-account holder.

Each of the payment sources 106 includes a transaction device 110 that, inter alia, controls the electronic deposit and withdrawal of funds to and from the various accounts at that source, including the buyer's account(s) 108, using an electronic "clearing house" 120 and associated electronic funds transfer (EFT) network 122, as described in more detail below. In one embodiment, the transaction devices 110 may comprise, for example, one or more servers located either local to, or remote from, the associated source 106, and which are operable to communicate with other, similar transaction devices through one or more public or private networks 112, e.g., via the internet, a public switched telephone network (PSTN) and/or private data networks, and to control the transfer of funds to and from the accounts respectively associated therewith through the clearing house and associated EFT network.

The exemplary system 100 further includes at least one seller's payment depository 114 serving as an "acquirer," i.e., as a financial institution having at least one seller's account 116 established thereat, and which is authorized by the seller 104 to receive electronic payments from buyers on behalf of the seller 104. For reasons similar to those of the buyer, the seller 104 may have a number of such accounts 116 established at either a single depository 114 or at a number of different depositories, as illustrated in FIG. 1. For example, the seller 104 may wish to have payments made for goods or services of a first type deposited in one account and payments for goods or services of another type deposited in a second account that may be located at a different depository from the first.

Like the payment sources 106, each of the payment depositories 114 has a transaction device 118, such as a transaction server, operable to communicate with other institutional transaction devices through one or more public or private networks 112 and to control the transfer of funds to and from the seller's accounts 116 respectively associated therewith through a clearing house 120 and associated EFT network 122.

The example payment system 100 illustrated in FIG. 1 also includes an associated transaction clearing device 120 and EFT network 122 that, as discussed above, is adapted to effect electronic transfers of funds from buyers' payment accounts to sellers' payment depository accounts via the associated EFT network in response to authorizations therefor provided to it by a payment service provider 124 of the system described below. In one embodiment, the transaction clearing device 120 and associated EFT network 122 may respectively comprise, for example, the servers and associated network of the Automated Clearing House (ACH) financial transaction network established and conducted under the joint auspices of the National Automated Clearing House Association and the U.S. Federal Reserve. In another embodiment, the clearing device and EFT network may comprise the privately sponsored Electronic Payment Network (EPN) or another network sponsored by a private credit card association, such as the Visa/MasterCard network.

As illustrated in FIG. 1, the payment service provider 124 is disposed centrally in the example payment system 100 like the hub of a wheel, and is mainly responsible for effecting payments from selected ones of the various buyer's accounts 108 to designated ones of the seller's accounts 116 in the manner described below. The payment service provider 124 includes one or more databases 126 for storing, among other things, information associating the identity of the buyer 102 with each of the buyer's payment source accounts 108, together with the PINs respectively associated therewith, and a payment service transaction device 128 that is operable to communicate with the transaction clearing device 120 and respective transaction devices of the buyer 102, seller 104, payment sources 106 and payment depositories 114, and to effect an electronic transfer of a specified payment amount from a selected buyer's payment source account 108 to a designated seller's payment depository account via the transaction clearing device 120 and network 122 in response to the receipt of an authorization therefor from the buyer 102 that includes the specified payment amount and the associated PIN of the selected buyer's payment source account 108 from which the payment funds are to be transferred.

Additionally, in one embodiment, at least one of the buyer's payment source account 108 and one of the seller's payment depository accounts 114 may both be provided by the payment service provider 124.

As will be appreciated, before the buyer 102 can use the service provider 124 to make payments, it is necessary for the buyer to contract, i.e., open an account, with the service provider for its payment services and to provide the service provider with the identities of the buyer's respective payment sources 106 and accounts 108 and their respective associated PINs, which relational information is then stored in the database(s) 126 of the service provider. Additionally, during the buyer's account setup procedure, the service provider may provide the buyer 102 with an account number, and optionally, one or more secret account passwords that enable the service provider to verify the identity of the buyer remotely.

In addition to the foregoing payment account setup step, it is also necessary for the buyer 102, and desirable for the seller 104, to be provided with respective transaction devices 130 and 132, each having selected buyer and seller information respectively associated therewith. In one embodiment, the buyer's transaction device 130 may comprise a simple plastic card having the buyer's identity, service provider identity and the buyer's service provider 124 account number associated with it, for example, by means of an encoded magnetic strip or an RFID device, and the seller's transaction device 132 may comprise a card reader that is adapted to read the seller information from the card, and which is also provisioned with the seller's identity and the identity of the seller's designated payment depository 114 and depository account 116 associated therewith. The seller's device 132 may also include an associated alphanumeric PIN/password input device, such as a keypad, touchpad or keyboard of a known type.

In an example use of the foregoing embodiment, the buyer 102 presents the payment card 130 when checking out at the seller POS 104, and the card is read by the seller's reader 132 to upload the buyer's information therefrom. The reader then establishes communication with the transaction device 128 of the payment service provider 124 via the communication network 112 and uploads both the above buyer's and seller's accounts and identity information to it. In one embodiment, the payment service transaction device 128 then prompts the buyer 102 to enter via the buyer's transaction device the PIN of the buyer's payment account 108 selected for funding the payment and compares it with the PIN numbers associated with the buyer's accounts stored in the database(s) 126. In another embodiment, the payment service transaction device 128 may first prompt the buyer 102 for the entry of one or more passwords to verify the identity of the buyer, and upon verification by reference to the password associated with the buyer's service provider account stored in the database 126, then prompt the buyer for the PIN of the selected buyer's account to be used for the payment transaction.

In the first embodiment, the PIN alone is used by the service provider transaction device 128 both to verify the buyer's identity and to select the buyer's account 108 to be used for the payment, whereas, in the second embodiment, both the correct password and PIN must be entered to effect the payment, thereby providing a higher level of security. In either embodiment, in the event the identity of the buyer 102 or selected account 108 cannot be verified, the service provider transaction device can be programmed to refuse the transaction and to return an "Invalid Buyer/Account" message to the seller's transaction device 132, and optionally, to prompt the buyer to enter another PIN and/or password.

In another embodiment, the service provider transaction device 128 can be adapted to interrogate the buyer's account 108 to determine whether the account has sufficient funds to effect the payment, and if not, to return an "Insufficient Funds" message to the seller's transaction device 132. Optionally, the service provider can also be adapted to prompt the buyer 102 for the PIN of another payment account to be used instead of or in addition to the account first selected for the payment. In this manner, the buyer can select one or more alternate accounts to use instead of the first account, or alternatively, to link to the first account, in order to fund the payment.

When the foregoing authorizations, verifications and confirmations have been made successfully, the service provider's transaction device 128 then effects an electronic transfer of the specified payment amount from the selected buyer's account 108 to the seller's payment depository account 116 via the transaction clearing device and network 120 and 122. Where the buyer's payment source account 108 and the seller's payment depository account are both established with the payment service provider, the service provider transaction device simply executes an internal electronic transfer of the funds. In either case, upon return confirmation from the respective accounts affected in the transaction, the service provider transaction device returns a "Payment Confirmed" or "Payment Successful" message to the seller's transaction device 132, and additionally, may store all of the details of the transaction in the database(s) 126 of the service provider 124 to create an electronic audit trail of the transaction.

In another example transaction, the seller 104 may comprise an automated teller machine (ATM). The operation of this system 100 is substantially similar to that described above, except that the buyer 102 receives the specified amount of cash from the seller instead of goods or services at the end of a successful transaction.

In an alternative embodiment to those described above, the buyer's transaction device 130 may comprise, for example, a personal digital assistant (PDA), a mobile telephone, such as a cell phone, or a personal computer (PC), provided with a web browser or other suitable transaction application software, a wired or wireless communication device, such as a transceiver or a modem coupled to the internet, adapted to communicate with the seller's transaction device 132, and in which the buyer's information is stored, including the buyer's identity, identity of the service provider 124 and the buyer's service provider account number.

The seller's transaction device 132 may comprise a web server located remotely from the buyer 102 and adapted to host a web-based marketplace 104 for the sale or auction of goods and services. Like the buyer's transaction device 130, the seller's transaction device is provisioned with the seller's identity and the identity of the seller's designated payment depository 114 and depository account 116 associated therewith, and is also provided with a suitable transaction application software and a communication device coupled to a network, e.g., the internet, and adapted to communicate with the respective transaction devices 130 and 128 of the buyer 102 and the service provider 124. The application software of the seller's transaction device may also include a software "payment module" that can be accessed by the buyer 102 to effect a payment transaction by, for example, selecting an icon, such as a "Proceed to Checkout" icon, provided on the seller's web page.

The operation of the foregoing payment system 100 is very similar to that of the embodiments described above, except that the locations of the buyer POP 102 and seller POS 104 are remote from each other, and the subject goods and services are typically delivered to the buyer by the seller or a seller's order fulfillment facility at a later date, rather than immediately.

As will be appreciated, it is strongly desirable in the example payment system 100 that all communications via the networks 112 and 122 between the respective transaction devices of the buyer 102, seller 104, payment service provider 124, payment sources 106, payment depositories 114 and transaction clearing devices 120 be secured by strong encryption systems. This may be effected in a variety of known ways, including the provision of, for example, virtual private network (VPN) software and hardware, and the use of cryptographic protocols, such as Transport Layer Security (TLS) or Secure Sockets Layer (SSL) protocols, for communications through the internet. Likewise, it is desirable that the payment transactions be effected by the system 100 in such a way that each of the buyer and seller's respective account information, passwords, PINs and the like, other than their respective identities, are invisible to the other for reasons of both security and privacy.

In each of the example embodiments described above, the payment system 100 includes a seller's transaction device 132 that is provisioned with the seller's identity and the identity of the seller's designated payment depository 114 and depository account 116 associated therewith, and through which both the seller's and buyer's identities and transaction information are transmitted to the payment service provider 124. However, in another alternative embodiment, it is also possible for the buyer 102 to make electronic payments to a remote payee 104 not equipped with such a transaction device, with the proviso that, in this embodiment, the buyer 102 must supply the payment service provider 124 with sufficient information about the payee as to enable the service provider to effect a payment to the payee in the desired amount.

In this embodiment, the buyer's transaction device 130 may, as in the above embodiment, comprise a similarly provisioned and equipped mobile phone, PC or PDA. However, in this embodiment, the buyer's transaction device communicates directly with the service provider's transaction device 126, rather than through the seller's transaction device 132, e.g., by logging onto a transaction server at the service provider 124 through a suitable communication network 112, e.g., the internet.

When the buyer 102 logs on, the buyer may select from a number of possible payment options, e.g., by direct deposit to a designated payee's account, by a printed check mailed to a payee's designated postal address, or by an "e-Check" transmitted to a designated payee's e-mail address. The buyer then selects the payment option desired, the amount of the payment, and the buyer's account(s) 108 from which the funds are to be withdrawn and, unlike the embodiments above, also enters the payee information necessary to complete the transaction, e.g., payee identification, payment depository, account number, mailing address, e-mail address, as is appropriate to the type of payment selected. As above, when the service provider transaction device 128 has verified the buyer's identity and confirmed the sufficiency of funds in the selected buyer's account(s) 108, it then effects the payment to the payee in the specified amount and in the manner selected by the buyer. In this embodiment, the payment service provider 124 may establish an internal "pass-through" account into which the payment funds are temporarily received from the selected payment account 108, and from which it then transmits the funds to the payee by mail or e-mail.

Figure 2:
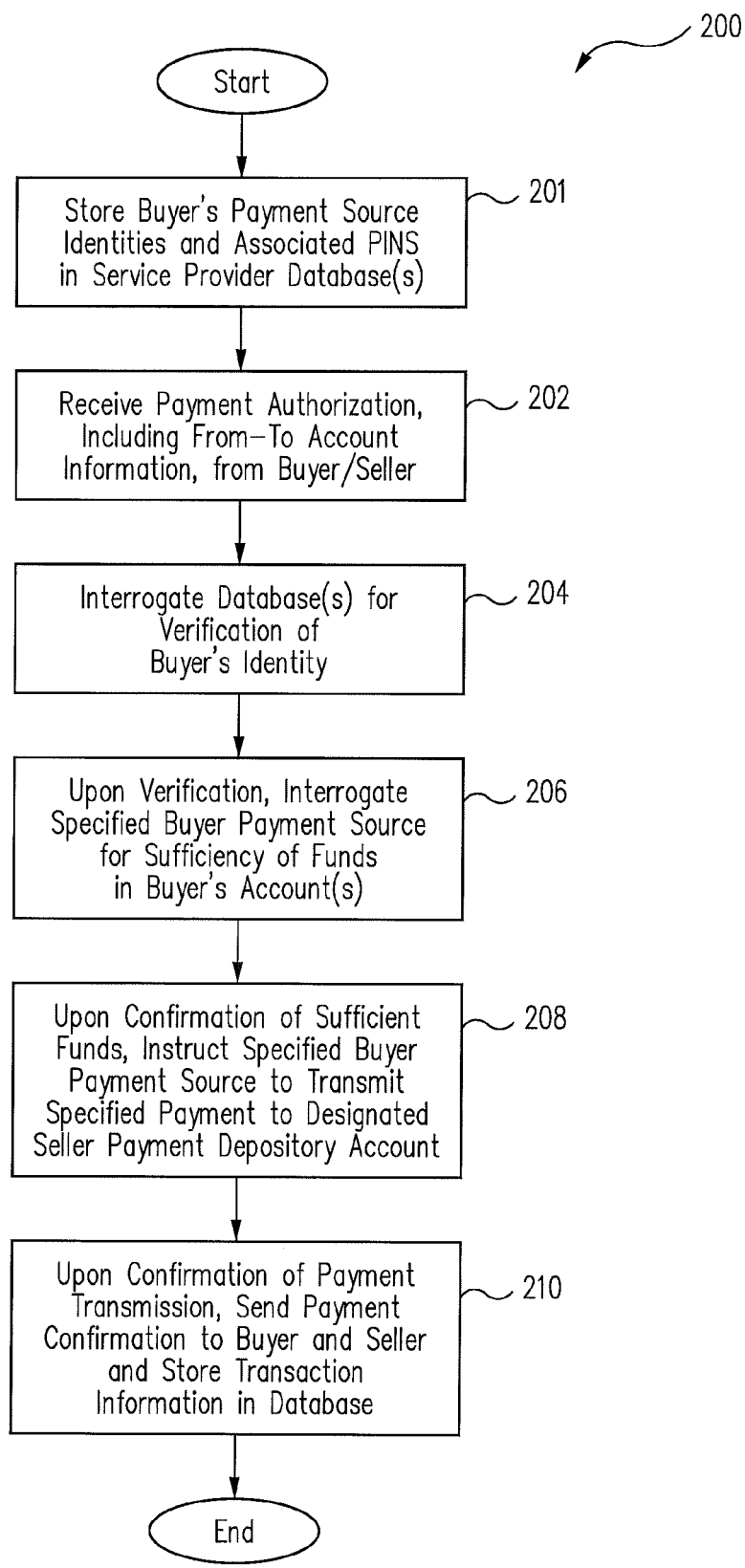
FIG. 2 is a flow chart of an example embodiment of a method for enabling a buyer to make payments to a seller from a selected one of a plurality of funding sources using the example payment system of FIG. 1; and, FIG. 3 is a flow chart illustrating the execution of the example method of FIG. 2 by the example payment system of FIG. 1.
Figure 3:
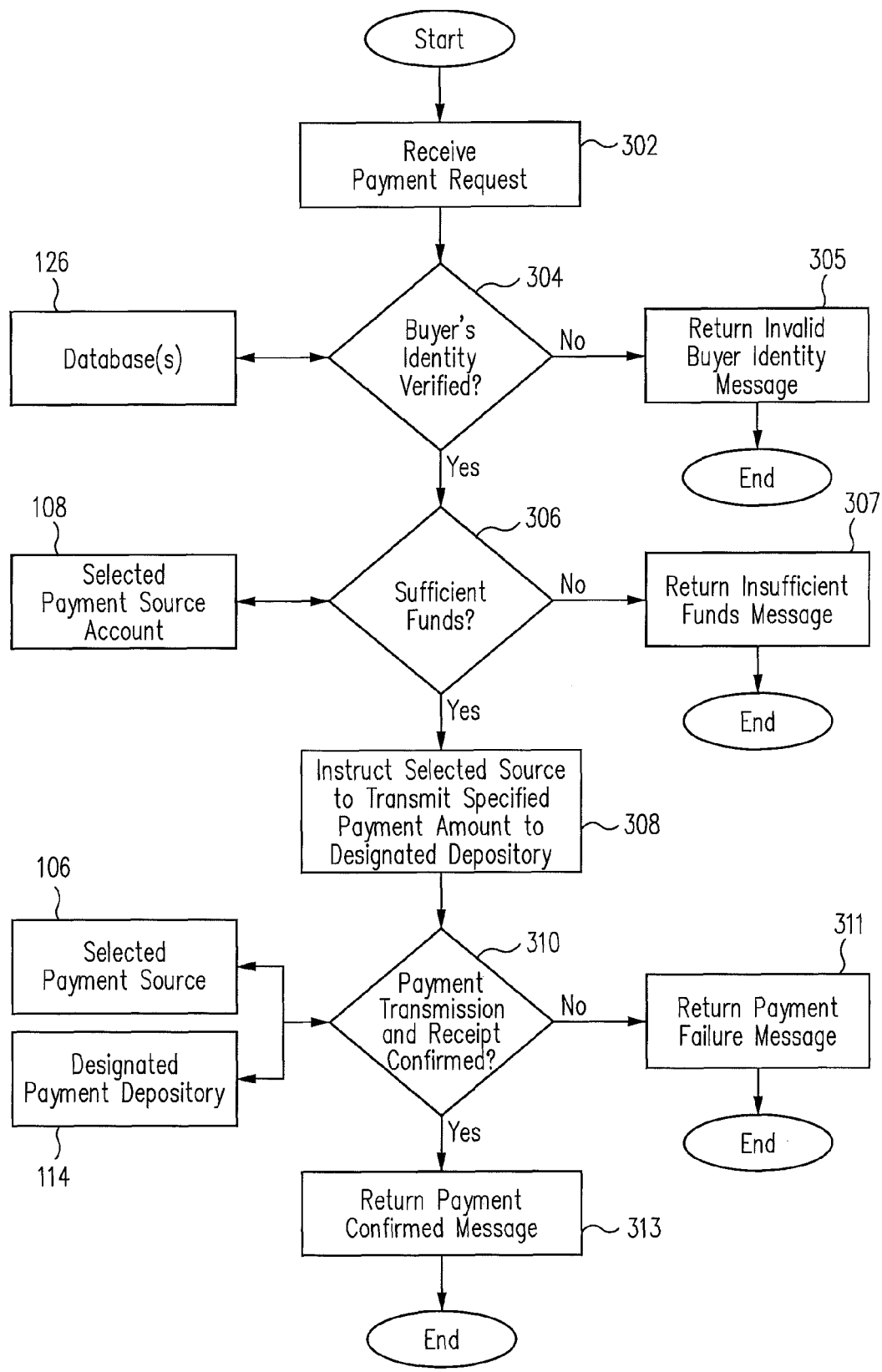

FIG. 2 is a flow chart of an example embodiment of a method 200 for enabling a buyer 102 to make payments to a seller 100 from a selected one of a plurality of funding sources 108 using the example payment system 100 of FIG. 1, and FIG. 3 is a flow chart illustrating some of the logical steps taken by the system during the execution of the example method.

In FIG. 2, the method 200 begins, as above, with a one-time pre-use or "setup" step 201 of establishing a buyer's account with the service provider 124 and providing it with the identities of the buyer's respective payment sources 106 and accounts 108 and their respective associated PINs, which are then stored in the database(s) 126 of the service provider. Additionally, the service provider may provide the buyer with a service provider account number and one or more secret account passwords by which the service provider can verify the identity of the buyer from a remote location.

In FIGS. 2 and 3, after the buyer's service provider account has been set up, the buyer 102 is then able to effect payments using the system 100, which begins at step 202, 302 with a receipt by the service provider's transaction device 128 of a payment authorization from the buyer. As discussed above, the payment authorization may come either directly from the buyer or indirectly through the seller's transaction device 132. Upon receipt of the payment authorization, the service provider transaction device at step 203, 304 prompts the buyer for the entry of a PIN and/or a password and compares these to the values stored in the database(s) 126 to verify the buyer's identity. At step 304, if the identity of the buyer cannot be verified, the service provider transaction device may refuse the transaction, and at step 305, return an "Invalid Buyer/Account" message to the buyer directly, or indirectly through the seller's transaction device, and optionally, may prompt the buyer to enter another PIN and/or password.

Upon verification of the buyer's identity, the service provider transaction device 128 may, at step 206, 306, then interrogate the selected buyer's account 108 having the associated PIN entered by the buyer to determine whether the account has sufficient funds to effect the payment, and if it does not, at step 307, return an "Insufficient Funds" message to the buyer. Additionally, the service provider transaction device may prompt the buyer 102 for the PIN of an alternate account to be used instead of or in addition to the first account so as to give the buyer the opportunity to select one or a combination of accounts having funds sufficient to fund the payment.

At step 208, 308, after confirming the sufficiency of funds in the selected buyer's accounts 108, the service provider's transaction device 128 then effects an electronic transfer of the specified payment amount from the selected buyer's account 108 to the seller's payment depository account 116 via the appropriate transaction clearing device and network 120 and 122, and at step 310, electronically confirms with the respective payment sources 106 and depositories 112 affected in the transaction that the transaction was successful. If the payment transaction was not successfully made for any reason, the service provider transaction device 128 may, at step 311 return a "Payment Failure" to the buyer 102 and/or seller 104, and if made successfully, return a "Payment Confirmed" or "Payment Successful" message to them at step 313, and in either case, may store all of the details of the transaction in the database(s) 126 of the service provider 124 to create an electronic audit trail of the transaction.

Although the systems and methods of the present invention have been described and illustrated herein with reference to certain specific example embodiments thereof, it should be understood that a wide variety of modifications and variations may be made to these without departing from the spirit and scope of the invention, as defined by the claims appended hereafter and their functional equivalents.

What is claimed is:

1. A method for operating a payment service provider, the method comprising:
providing a server having at least one processor; and
using the at least one processor to perform a method comprising:
associating the identity of a buyer with each of a plurality of payment source accounts of the buyer to form a corresponding plurality of buyer-identity/buyer's-payment-source-account associations;
assigning a unique number to each of the associations;
storing the associations and their corresponding unique numbers in a database of the payment service provider;
receiving an authorization from the buyer to make a payment from a selected one of the buyer's payment source accounts to a designated seller's payment depository account, the authorization including a specified payment amount and the unique number associated with the selected buyer's payment source account from which the buyer desires the payment to be made; and
effecting a transfer of the specified payment amount from the selected buyer's payment source account to the designated seller's account.

2. The method of claim 1, further comprising using the at least one processor for verifying the buyer's identity before effecting the transfer.

3. The method of claim 2, further comprising using the at least one processor for transmitting a message to the buyer, the seller or both the buyer and the seller that the buyer's identity cannot be verified.

4. The method of claim 2, wherein the verifying comprises:
receiving a password of the buyer from a transaction device of the buyer or a transaction device of the seller; and
verifying the identity of the buyer using the password.

5. The method of claim 1, further comprising using the at least one processor for determining whether the selected buyer's payment account has sufficient funds to effect the transfer of the specified payment amount before effecting the transfer.

6. The method of claim 5, further comprising using the at least one processor for transmitting a message to the buyer, the seller or both the buyer and the seller that there are insufficient funds in the selected seller's payment source account.

7. The method of claim 6, further comprising:
using the at least one processor for:
receiving a second authorization from the buyer to make the payment from another one of the buyer's payment source accounts to the designated seller's payment depository account, the second authorization including the associated unique number of the buyer's other account from which the payment is to be made; and,
effecting a transfer of the specified payment amount to the designated seller's account from one or both of the buyer's other account and/or the selected buyer's account.

8. The method of claim 1, wherein the identity of the designated seller's payment depository account is provided by a transaction device of the seller or a transaction device of the buyer.

9. The method of claim 1, wherein the transfer of the specified payment amount is effected by the payment service provider electronically through a payment clearing device and an associated electronic funds transfer (EFT) network.

10. The method of claim 1, wherein the authorization is received from a transaction device of the buyer or a transaction device of the seller.

11. The method of claim 1, wherein:
the designated seller's payment depository account comprises a postal or e-mail address of the seller, and
the effecting comprises transmitting a check to the postal or e-mail address of the seller.

12. The method of claim 1, further comprising using the at least one processor for sending a message to the buyer, the seller or both the buyer and the seller Confirming that the specified payment amount has been successfully transferred from the selected buyer's account to the designated seller's account.

13. The method of claim 1, further comprising using the at least one processor for sending a message to the buyer, the seller or both the buyer and the seller advising that the specified payment amount was not successfully transferred from the selected buyer's account to the designated seller's account.

14. The method of claim 1, further comprising using the at least one processor for storing details of the requesting and effecting in a database of the service provider.

15. The method of claim 1, wherein:
the buyer's selected payment source account and the designated seller's payment depository account are both established at the service provider, and
the effecting comprises executing an internal electronic transfer of the payment amount from the buyer's selected payment source account to the sellers payment depository account.

16. A non-transitory machine-readable medium comprising a plurality of machine-readable instructions which, when executed by one or more processors of a server, are adapted to cause the server to perform a method comprising:
associating the identity of a buyer with each of a plurality of payment source accounts of the buyer to form a corresponding plurality of buyer-identity/buyer's-payment-source-account associations;
assigning a unique number to each of the associations;
storing the associations and their corresponding unique numbers in a database of a payment service provider;
receiving an authorization from the buyer to make a payment from a selected one of the buyer's payment source accounts to a designated seller's payment depository account, the authorization including a specified payment amount and the unique number associated with the selected buyer's payment source account from which the buyer desires the payment to be made; and
effecting a transfer of the specified payment amount from the selected buyer's payment source account to the designated seller's account.

17. The non-transitory machine-readable medium of claim 16, wherein the method further comprises verifying the buyer's identity before effecting the transfer.

18. The non-transitory machine-readable medium of claim 16, wherein the method further comprises determining whether the selected buyer's payment account has sufficient funds to effect the transfer of the specified payment amount before effecting the transfer.

19. The non-transitory machine-readable medium of claim 16, wherein the identity of the designated seller's payment depository account is provided by a transaction device of the seller or a transaction device of the buyer.

20. The non-transitory machine-readable medium of claim 16, wherein the transfer of the specified payment amount is effected by the payment service provider electronically through a payment clearing device and an associated electronic funds transfer (EFT) network.

* * * * *

UNITED STATES PATENT AND TRADEMARK OFFICE
CERTIFICATE OF CORRECTION

| | | |
|---|---|---|
| PATENT NO. | : 8,255,303 B2 | Page 1 of 1 |
| APPLICATION NO. | : 12/176978 | |
| DATED | : August 28, 2012 | |
| INVENTOR(S) | : German Scipioni | |

It is certified that error appears in the above-identified patent and that said Letters Patent is hereby corrected as shown below:

In the Claims

In column 9 line 36, change the word "Confirming" to -- confirming --.

Signed and Sealed this
Twenty-second Day of July, 2014

Michelle K. Lee
*Deputy Director of the United States Patent and Trademark Office*